W. BLACKER.
MECHANICAL OR POWER ACTUATED HAMMER.
APPLICATION FILED MAR. 29, 1919.

1,349,939.

Patented Aug. 17, 1920.
2 SHEETS—SHEET 2.

UNITED STATES PATENT OFFICE.

WILLIAM BLACKER, OF STALEYBRIDGE, ENGLAND.

MECHANICAL OR POWER-ACTUATED HAMMER.

1,349,939.  Specification of Letters Patent.  Patented Aug. 17, 1920.

Application filed March 29, 1919. Serial No. 285,984.

*To all whom it may concern:*

Be it known that I, WILLIAM BLACKER, a subject of the King of Great Britain and Ireland, residing at 62 Stocks lane, Staleybridge, in the county of Lancaster, England, have invented certain new and useful Improvements in or Relating to Mechanical or Power-Actuated Hammers, of which the following is a specification.

This invention relates to power driven mechanical hammers of the kind in which the hammer head is carried upon and swung by supporting arms as for example parallel arms as described in the following British patents heretofore granted to me, 24,544 of 1910, 28,656 of 1911 and 13,645 of 1915.

In such hammers, the head has usually been traversed laterally over the work by means of a screw threaded shaft operated through gears or mechanism which permitted said screw theaded shaft to be rotated in opposite directions as required.

Friction gearing has also been employed for raising and lowering objects, the same being provided with means for reversing rotation, this change being effected by hand and practicable only when the machine is not working.

I provide for reversing the direction of rotation while the machine is working and by foot operated gearing leaving the operator's hands free to control the hammer. To this end the toothed gears are hung so as to be always in mesh with each other the two friction gears being shifted respectively into or out of gear with the frictional driving disk by the action of a double acting foot treadle and connecting means.

The drawing illustrates a simple and effective combination in accordance with the feature of novelty above recited.

In the construction shown, the inner face of the fly-wheel $a$ is formed with a flange and the internal periphery $a'$ is prepared to constitute a frictional driving surface which may if necessary be lined or prepared.

Figure 1:
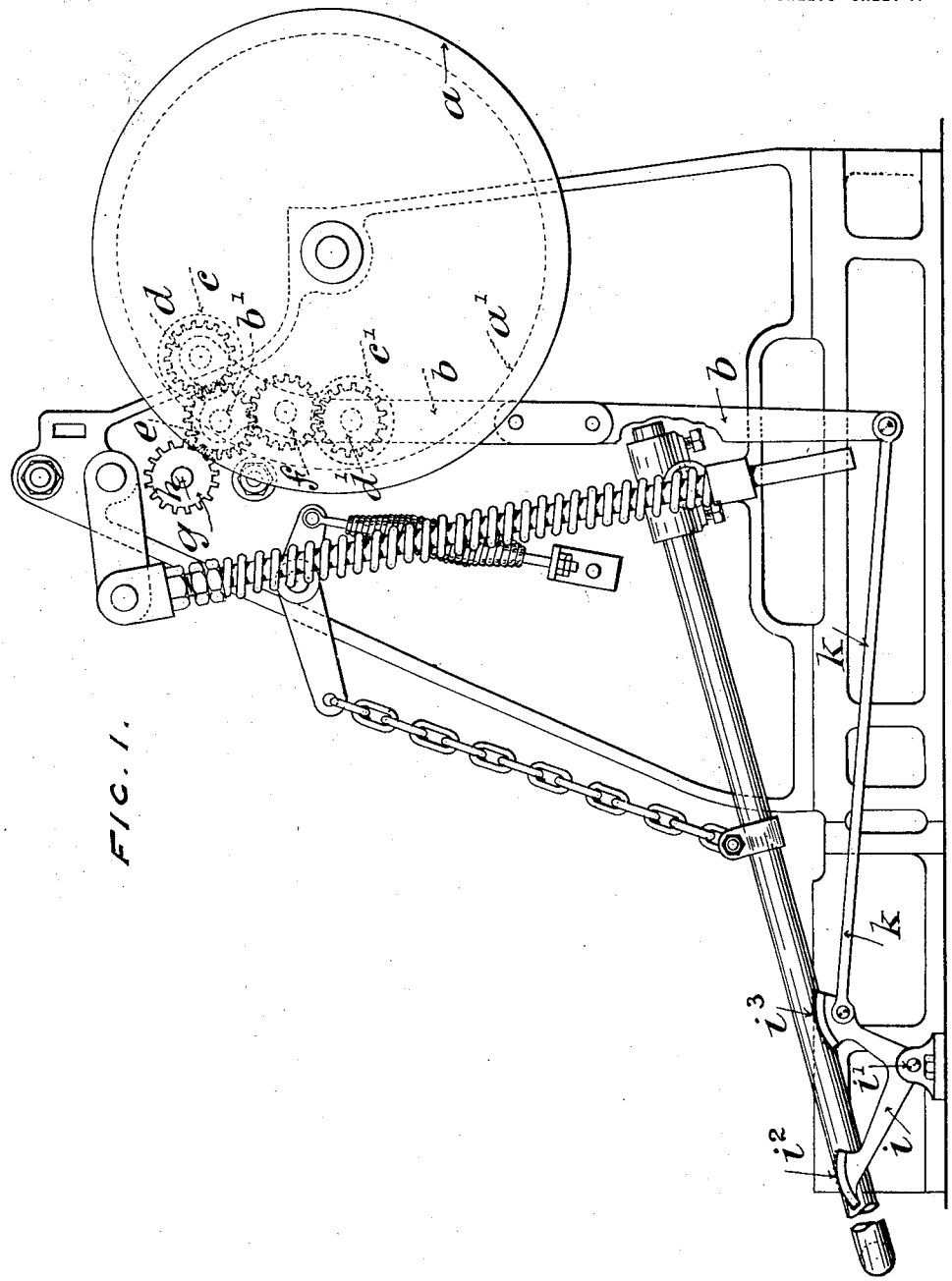
Figure 1 is a side elevation of so much of the structure of a mechanical or power hammer as is requisite to explain the invention, and such figure shows a combination of friction wheels and toothed gears for effecting the desired rotation of the screw threaded shaft in opposite directions as required.
Figure 2:
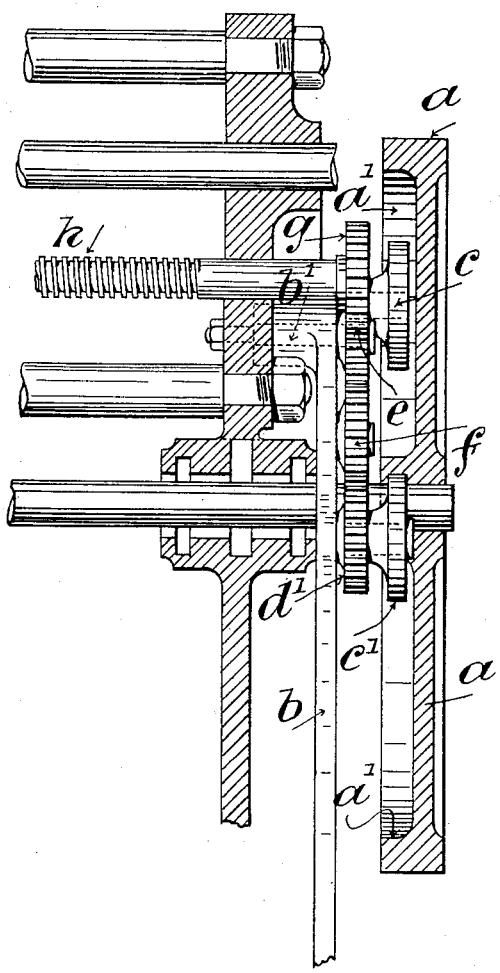
Fig. 2 is a sectional elevation of the upper part of Fig. 1, taken at right-angles and clearly shows the friction disks and toothed gears, etc.

Upon the end standard of the hammer, or otherwise suitably supported, is a pivoted lever $b$. This is shown fulcrumed at $b'$ and also as made in two parts—an upper cast-iron portion and a lower wrought-iron length. This pivoted lever $b$ supports two cast-iron or other friction disks $c$, $c'$ which are attached to or compounded with toothed gear wheels $d$, $d'$ capable of revolving on studs or axles fixed in the pivoted lever $b$. The toothed gear wheel $d$ compounded with the friction disk $c$ gears direct into the toothed wheel $e$ which is revoluble around the fulcrum $b'$, while the toothed gear $d'$ compounded with the friction disk $c'$ meshes with an intermediate gear wheel $f$ also supported on the pivoted lever $b$ such intermediate gear $f$ in turn gearing with the toothed wheel $e$. This toothed gear $e$ meshes with the toothed gear wheel $g$ fixed on the end of the screw threaded shaft $h$ and it is the rotation of this screw threaded shaft $h$ in one or other direction which moves the hammer head, as is known. So long as the pivoted lever $b$ fulcrumed at $b'$ occupies the position shown in Fig. 1, the screw threaded shaft $h$ does not rotate and the hammer head is not traversed. If, however, the pivoted lever $b$ be moved upon its fulcrum and the friction disk $d$ caused to contact with the inner periphery $a'$ then through the gear wheels $d$, $e$, $g$, the screw threaded shaft $h$ is rotated in one direction. On the other hand, if the pivoted lever is so moved as to bring the friction disk $c'$ into contact with the inner periphery $a'$ then through the gear wheels $d'$, $f$, $e$, $g$, the screw threaded shaft $h$ is rotated in the opposite direction. It is thus seen that just as one or other of the friction disks is brought into contact, so the screw threaded shaft is driven in one direction or the other, while with both disks out of contact, rotation of said shaft at once ceases.

The manner of working the pivoted lever $b$ or its equivalent may vary considerably. In the drawing the actuation is by means of a cranked lever $i$ pivoted at $i'$ and having small foot plates or surfaces $i^2$, $i^3$. Such cranked lever $i$ works the pivoted lever $b$ by a connecting rod $k$. By pressing with the foot on one or other of the limbs of the cranked lever $i$, the connecting rod $k$ is caused to actuate the pivoted lever $b$ and engage one or other of the friction disks as required and as is obvious.

Clearly the manner of putting friction surfaces into and out of contact with a rotary surface so as to actuate constantly meshing gear wheels for my purpose may be varied.

By my invention is obtained a very steady actuation of the screw threaded shaft as and when required without liability to creep. The gears run with very little noise and are durable and a simple or single screw thread cut on the screw threaded shaft $h$ serves the desired purpose in effective fashion.

I declare that what I claim is:

1. In combination with a hammer and a screw-threaded shaft for causing its lateral traverse, a gear wheel on said shaft turning therewith, a reversing lever carrying a gear wheel in mesh therewith, additional gear wheels of a reversing system carried by said lever and permanently meshing with the second gear above mentioned, friction disks turning with the latter wheels, a driving friction wheel engaging one or the other of said disks, according to the position of said lever, to turn said shaft in either direction as chosen, a doubly acting treadle, and means for connecting said treadle to said lever in order that the lateral traverse of the hammer may be reversed while the machine is working and while the operator's hands are employed in controlling the hammer.

2. In combination with a driving disk having an internal frictional annular surface, a pair of friction disks arranged to engage said surface alternatively, a lever carrying said disks and movable to shift either one of said disks into or out of such engagement, a hammer-traversing shaft, gearing arranged to be shifted into position for turning said shaft in one direction when one of said disks is in engagement and in the other direction when the other disk is in contact and a treadle provided with means connecting it to said lever and adapted to reverse by the pressure of the operator's foot the lateral traverse of the hammer while the machine is in operation, substantially as set forth.

3. Reversing mechanism for the traverse screw of a power hammer comprising a driven gear secured on said screw, a reversible gear meshing with the driven gear, a swinging lever pivoted on the axis of the reversible gear, a compound gear and an idler gear carried by said lever, each of said compound gears having two gear portions, one of which is frictional, a driving frictional gear member, one gear portion of one of the compound gears being meshed with said reversible gear, and a corresponding gear portion of the other compound gear being geared to the reversible gear through the idler, a doubly acting treadle and means connecting the same to said lever for swinging the latter by the pressure of the operator's foot in one direction or the other, the toothed gear wheels being continuously in mesh and the swinging movement of said lever in one direction bringing one or the other of the frictional gear portions of said compound gears into engagement with said driving frictional gear member.

4. A screw for causing lateral traverse of a power hammer-head, in combination with means for reversing such traverse, a doubly acting treadle gear supporting lever and connecting means between said treadle and lever whereby said reversing means may be operated while the machine is in action without requiring the operator's hands, said reversing means including frictional gears arranged to be thrown into and out of operative position by said treadle.

5. A screw for causing lateral traverse of a power hammer-head, in combination with a peripherally flanged disk, reversing gearing which comprises a series of wheels permanently in gear and a pair of friction disks either one of which is adapted to be shifted into contact with the flange of said disk, a lever on which said reversing gears are mounted and a treadle for operating said lever.

In testimony whereof, I have signed my name to this specification in the presence of two subscribing witnesses.

WILLIAM BLACKER.

Witnesses:
JOSHUA ENTWISLE,
RICHARD WEBSTER IBBERSON.